(12) United States Patent
Foti

(10) Patent No.: US 12,739,746 B2
(45) Date of Patent: Sep. 15, 2026

(54) NETWORK NODES, USER EQUIPMENT AND METHODS PERFORMED THEREIN

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 18/568,974

(22) PCT Filed: Jun. 14, 2022

(86) PCT No.: PCT/EP2022/066120
§ 371 (c)(1),
(2) Date: Dec. 11, 2023

(87) PCT Pub. No.: WO2022/268568
PCT Pub. Date: Dec. 29, 2022

(65) Prior Publication Data

US 2024/0292322 A1 Aug. 29, 2024

Related U.S. Application Data

(60) Provisional application No. 63/214,288, filed on Jun. 24, 2021.

(51) Int. Cl.
*H04W 48/20* (2009.01)
*H04L 65/1016* (2022.01)
*H04L 67/51* (2022.01)

(52) U.S. Cl.
CPC ......... *H04W 48/20* (2013.01); *H04L 65/1016* (2013.01); *H04L 67/51* (2022.05)

(58) Field of Classification Search
CPC . H04L 65/1016; H04L 65/1073; H04L 67/51; H04L 65/1069; H04L 67/53;
(Continued)

(56) References Cited

U.S. PATENT DOCUMENTS

2020/0153875 A1* 5/2020 Karampatsis ....... H04L 65/1016
2020/0267554 A1* 8/2020 Faccin .................. H04W 12/06
(Continued)

FOREIGN PATENT DOCUMENTS

WO 2021205339 A1 10/2021

OTHER PUBLICATIONS

"3GPP TR 23.700-07 V1.2.0", 3rd Generation Partnership Project; Technical Specification Group Services and System Aspects; Study on enhanced support of non-public networks (Release 17), Nov. 2020, pp. 1-247.

(Continued)

*Primary Examiner* — Mong-Thuy T Tran
(74) *Attorney, Agent, or Firm* — Murphy, Bilak & Homiller, PLLC

(57) ABSTRACT

A method performed by a first network node, such as an AMF, for providing an IMS service for a UE in a wireless communications network. The first network node obtains an IMS provider name for the UE (10) using the IMS service; and selects a second network node (14) for the IMS service based on the obtained IMS provider name.

13 Claims, 18 Drawing Sheets

(58) Field of Classification Search
CPC ..... H04L 67/14; H04L 41/5058; H04L 65/65; H04L 67/303; H04L 67/306; H04L 67/60; H04W 48/18; H04W 48/20; H04W 76/12; H04W 76/10; H04W 4/50; H04W 80/04; H04W 28/24
See application file for complete search history.

(56) References Cited

U.S. PATENT DOCUMENTS

| | | | | |
|---|---|---|---|---|
| 2020/0305033 | A1* | 9/2020 | Keller | H04W 36/00226 |
| 2020/0359439 | A1* | 11/2020 | Qiao | H04W 40/246 |
| 2020/0389830 | A1 | 12/2020 | Park et al. | |
| 2021/0184875 | A1* | 6/2021 | Qiao | H04W 76/18 |
| 2022/0167147 | A1* | 5/2022 | Karimli | H04W 4/50 |
| 2022/0182962 | A1* | 6/2022 | Sridharan | H04W 8/24 |
| 2023/0199632 | A1* | 6/2023 | Talebi | H04W 48/10<br>455/434 |
| 2023/0309158 | A1* | 9/2023 | Qiao | H04W 72/1268 |
| 2023/0403640 | A1* | 12/2023 | Kunz | H04W 8/02 |
| 2024/0323769 | A1* | 9/2024 | Chai | H04W 12/06 |

OTHER PUBLICATIONS

"3GPP TR 23.700-07 V17.0.0", 3rd Generation Partnership Project; Technical Specification Group Services and System Aspects; Study on enhanced support of Non-Public Networks (NPN) (Release 17), Mar. 2021, pp. 1-248.

"3GPP TR 23.700-10 V0.4.0", 3rd Generation Partnership Project; Technical Specification Group Core Network and Terminals; Study on enhanced IP Multimedia Subsystem (IMS) to 5GC integration Phase 2; CT WG1 aspects (Release 17), Mar. 2021, pp. 1-17.

"3GPP TR 23.700-12 V0.5.0", 3rd Generation Partnership Project; Technical Specification Group Core Network and Terminals; Study on enhanced IP Multimedia Subsystem (IMS) to 5GC integration Phase 2; CT WG4 aspects (Release 17), Jun. 2021, pp. 1-19.

"3GPP TR 23.700-40 V0.4.0", 3rd Generation Partnership Project; Technical Specification Group Services and System Aspects; Study on enhancement of network slicing; Phase 2 (Release 17), Jun. 2020, pp. 1-143.

"3GPP TS 23.228 V16.4.0", 3rd Generation Partnership Project; Technical Specification Group Services and System Aspects; IP Multimedia Subsystem (IMS); Stage 2 (Release 16), Mar. 2020, pp. 1-349.

"3GPP TS 23.502 V16.4.0", 3rd Generation Partnership Project; Technical Specification Group Services and System Aspects; Procedures for the 5G System (5GS); Stage 2 (Release 16), Mar. 2020, pp. 1-582.

"3GPP TS 23.503 V16.4.0", 3rd Generation Partnership Project; Technical Specification Group Services and System Aspects; Policy and charging control framework for the 5G System (5GS); Stage 2 (Release 16), Mar. 2020, pp. 1-115.

"P-CSCF discovery support with one slice connecting to multiple IMS network", 3GPP TSG-CT WG4 Meeting #104-e, C4-213153, E-Meeting, May 19-28, 2021, pp. 1-3.

"3GPP TS 23.003 V16.4.0", 3rd Generation Partnership Project; Technical Specification Group Core Network and Terminals; Numbering, addressing and identification; (Release 16), Sep. 2020, pp. 1-86.

"3GPP TS 24.501 V16.4.1", 3rd Generation Partnership Project; Technical Specification Group Core Network and Terminals; Non-Access-Stratum (NAS) protocol for 5G System (5GS); Stage 3; (Release 16), Mar. 2020, pp. 1-666.

"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.

* cited by examiner

Figure 1:
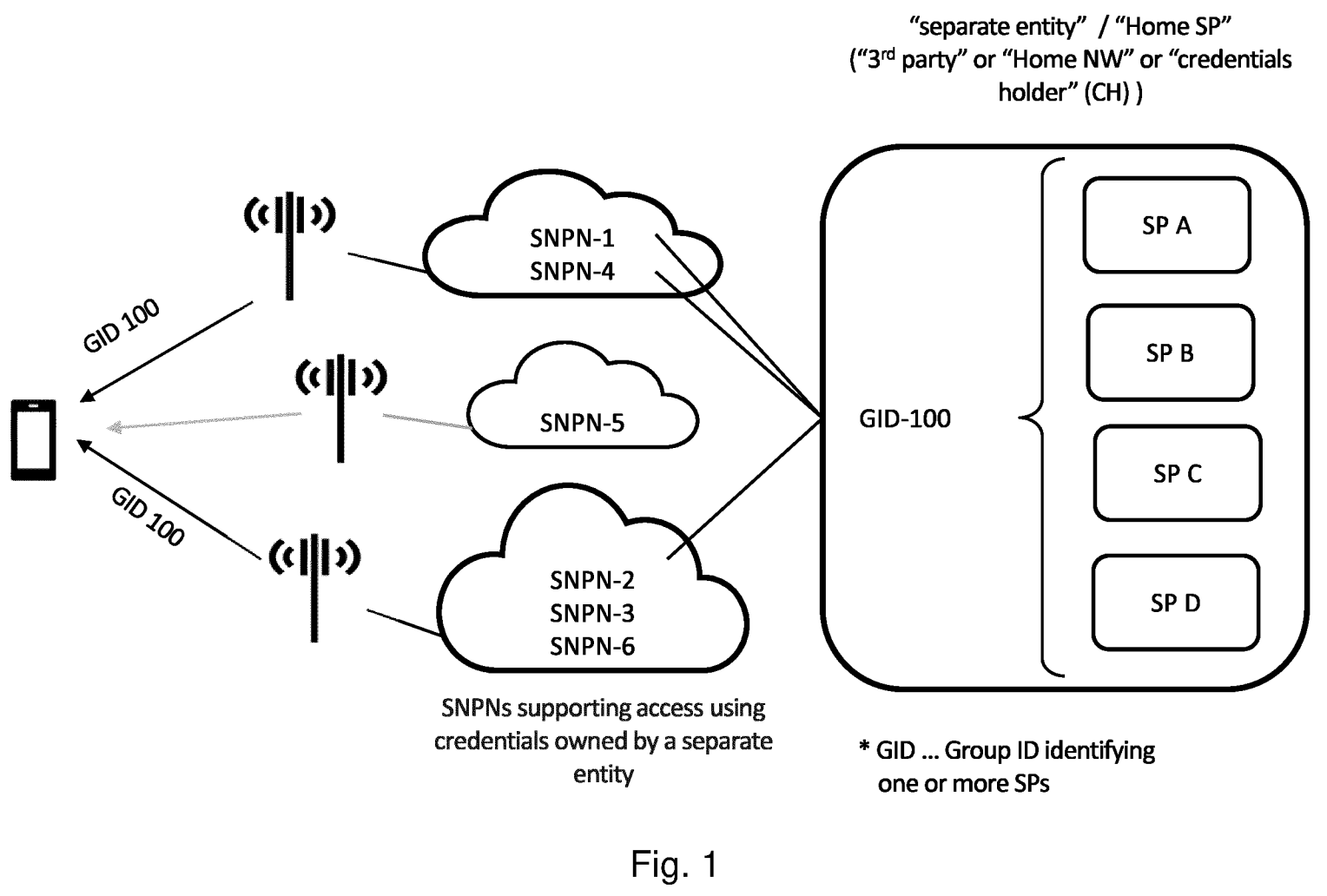

"separate entity" / "Home SP"
("3rd party" or "Home NW" or "credentials holder" (CH) )

SP A

SP B

SP C

SP D

GID-100

* GID ... Group ID identifying one or more SPs

SNPN-1
SNPN-4

SNPN-5

SNPN-2
SNPN-3
SNPN-6

SNPNs supporting access using credentials owned by a separate entity

GID 100

GID 100

NETWORK NODES, USER EQUIPMENT AND METHODS PERFORMED THEREIN

TECHNICAL FIELD

Embodiments herein relate to a first network node, a second network node, a user equipment (UE) and methods performed therein regarding wireless communication. Furthermore, a computer program product and a computer-readable storage medium are also provided herein. In particular, embodiments herein relate to handling communication, such as handling or enabling IP multimedia subsystem (IMS) service, in a wireless communications network.

BACKGROUND

In a typical wireless communications network, UEs, also known as wireless communication devices, mobile stations, stations (STA) and/or wireless devices, communicate via a Radio Access Network (RAN) with one or more core networks (CN). The RAN covers a geographical area which is divided into service areas or cells, with each service area or cell being served by a radio network node such as an access node, e.g., a Wi-Fi access point or a radio base station (RBS), which in some networks may also be called, for example, a NodeB, a gNodeB, or an eNodeB. The service area or cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and investigate, e.g., enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and coming 3GPP releases, such as New Radio (NR), are worked on. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

3GPP is currently working on Release 17 enhancements to first specifications of the 5G system (Release 15/16). These types of enhancements are made to functionality that was introduced in early releases of the 5G specification.

One such functionality is Non-Public Networks, also known as NPNs, that was introduced in Release 16.

3GPP introduced support for two non-public networks deployment options from Release 16. The first NPN option outlines how operators could support non-public networks or dedicated deployments by associating them directly to the operator network. Such improvements resulted in solutions for what is commonly referred to as Public Network Integrated NPN's (PNI-NPN).

The second NPN option is the stand-alone NPN, or SNPN for short. In almost all aspects, this is a network that carries the same functionality and characteristics as the more commonly known Public Land Mobile Network (PLMN), but it differs in some aspects, e.g., an SNPN is identified by an SNPN ID rather than a PLMN ID. The SNPN ID is composed of a PLMN ID and a Network ID (NID). Additionally, there is no support for mobility between SNPNs, in the same way as is possible between, equivalent, PLMNs.

NPN Enhancements.

For NPN, the enhancements currently addressed are described in 3GPP technical report (TR) 23.700-07 v1.2.0: Study on enhanced support of non-public networks, which outlines several key issues, which can be translated into enhancement areas.

SNPN access using credentials from a separate entity, Key issue #1. Key issue (KI) #1 describes a situation when a UE can access an SNPN using credentials not from the SNPN itself, but from another, separate entity, which can be another Service Provider, SP, or Subscription Provider.

The challenges related to KI #1 are described in TR 23.700-07 v1.2.0 as:

"This key issue aims at addressing the following points for SNPN along with subscription owned by an entity separate from the SNPN:

How to identify the separate entity providing the subscription.

Network selection enhancements, including UEs with multiple subscriptions;

E.g., how does the UE discover and select an SNPN which provides authentication in an external entity;

Architecture enhancements needed to support multiple separate entities, e.g.:

What are the interfaces exposed and/or used by SNPN and the separate entity;

What is the architecture and solution for a UE accessing a separate entity via SNPN access network;

How to exchange authentication signalling between the SNPN and the separate entity, including:

Authentication by the PLMN, based on PLMN identities and credentials, for access to the SNPN;

Authentication via SNPN to separate entity based on non-3GPP identities (e.g. non-IMSI) and credentials;

Mobility scenarios, including service continuity, for:

UE moving from SNPN #1 with separate entity #1 to SNPN #2 with separate entity #1 available; and UE moving between SNPN #1 (where separate entity=PLMN) and PLMN. NOTE: Security aspects should be defined by SA WG3." 3GPP TR 23.700-07 v1.2.0 indicates the following relevant conclusions for KI #1:

Group ID as a specific case of SNPN ID reusing SNPN ID encoding in TS 23.003-g40, where SIB will be enhanced as follows, for SNPN only:

Indication that "access using credentials from a separate entity is supported"

Optionally, supported Group identities (GIDs)

Optionally, an indication whether the SNPN allows registration attempts from UEs that are not explicitly configured to select the SNPN In the following, it is explained the above conclusions for KI #1.

In order for a UE to discover and select an SNPN which provides authentication in an external entity, such as the SP, TR 23.700-07 v1.2.0 concludes that SNPNs need to indicate these new functionalities to UEs. Otherwise, the UEs would not know that they can access these networks with the credentials they possess from the service/subscriber provider (SP).

Furthermore, it was also concluded to allow an SNPN to indicate whether it allows registration attempts from UEs that are not explicitly configured to select this SNPN, hence enabling UEs to perform blind registration attempts, which eventually, may fail if the SNPN does not have means to authenticate the UE.

FIG. 1 shows an association between SNPN and (group of) SPs, the latter being identified by a GID.

SUMMARY

As part of developing embodiments here one or more problems were first identified. There is a requirement for an SNPN outsourcing IP multimedia subsystem (IMS) voice services to a third party IMS provider to be able to support more than a single third party IMS provider. Current restriction is a 1 to 1 relationship.

An object herein is to provide a mechanism to handle communication in an efficient manner in the wireless communications network.

According to an aspect the object is achieved, according to embodiments herein, by providing a method performed by a first network node, such as an Access and Mobility Management Function (AMF), for handling communication or providing and/or enabling an IMS service for a UE in a wireless communications network. The first network node obtains an IMS provider name for the UE using the IMS service such as voice over LTE (VOLTE). The IMS provider name may be received from the UE, from a UE subscription, or from the third network node. The first network node selects a second network node for the IMS service based on the obtained IMS provider name.

According to another aspect the object is achieved, according to embodiments herein, by providing a method performed by a UE for handling communication or an IMS service in a wireless communications network. The UE provides to a first network node, an IMS provider name for the UE using the IMS service. For example, the UE may include an IMS provider name in a registration such as a 5GC Registration Procedure to the first network node.

According to yet another aspect the object is achieved, according to embodiments herein, by providing a method performed by a second network node, such as a Session Management Function (SMF), for handling communication or providing and/or enabling an IMS service for a UE in a wireless communications network. The second network node may obtain an IMS provider name for the UE using the IMS service. The second network node uses the IMS provider name to perform network repository function (NRF) discovery to discover one or more IMS nodes for the UE using the IMS service.

According to still another aspect the object is achieved, according to embodiments herein, by providing a first network node, a second network node and a UE configured to perform the methods herein, respectively.

Thus, it is herein provided a first network node for providing an IMS service for a UE in a wireless communications network. The first network node is configured to obtain an IMS provider name for the UE using the IMS service. The first network node is further configured to select a second network node for the IMS service based on the obtained IMS provider name.

It is also herein provided a UE for handling an IMS service in a wireless communications network. The UE is configured to provide to a first network node, an IMS provider name for the UE using the IMS service.

It is herein provided a second network node for providing an IMS service for a UE in a wireless communications network. The second network node is configured to use an IMS provider name to perform NRF discovery to discover one or more IMS nodes for the UE using the IMS service.

It is furthermore provided herein a computer program product comprising instructions, which, when executed on at least one processor, cause the at least one processor to carry out the methods herein, as performed by the first network node, the second network node, and the UE, respectively. It is additionally provided herein a computer-readable storage medium, having stored thereon a computer program product comprising instructions which, when executed on at least one processor, cause the at least one processor to carry out the methods herein, as performed by the first network node, the second network node, and the UE, respectively.

Hence, embodiments herein provide a mechanism to efficiently handle an IMS service in the wireless communications network.

BRIEF DESCRIPTION OF THE DRAWINGS

Embodiments will now be described in more detail in relation to the enclosed drawings, in which:

FIG. 1 shows an architecture according to prior art;

DETAILED DESCRIPTION

Figure 2:
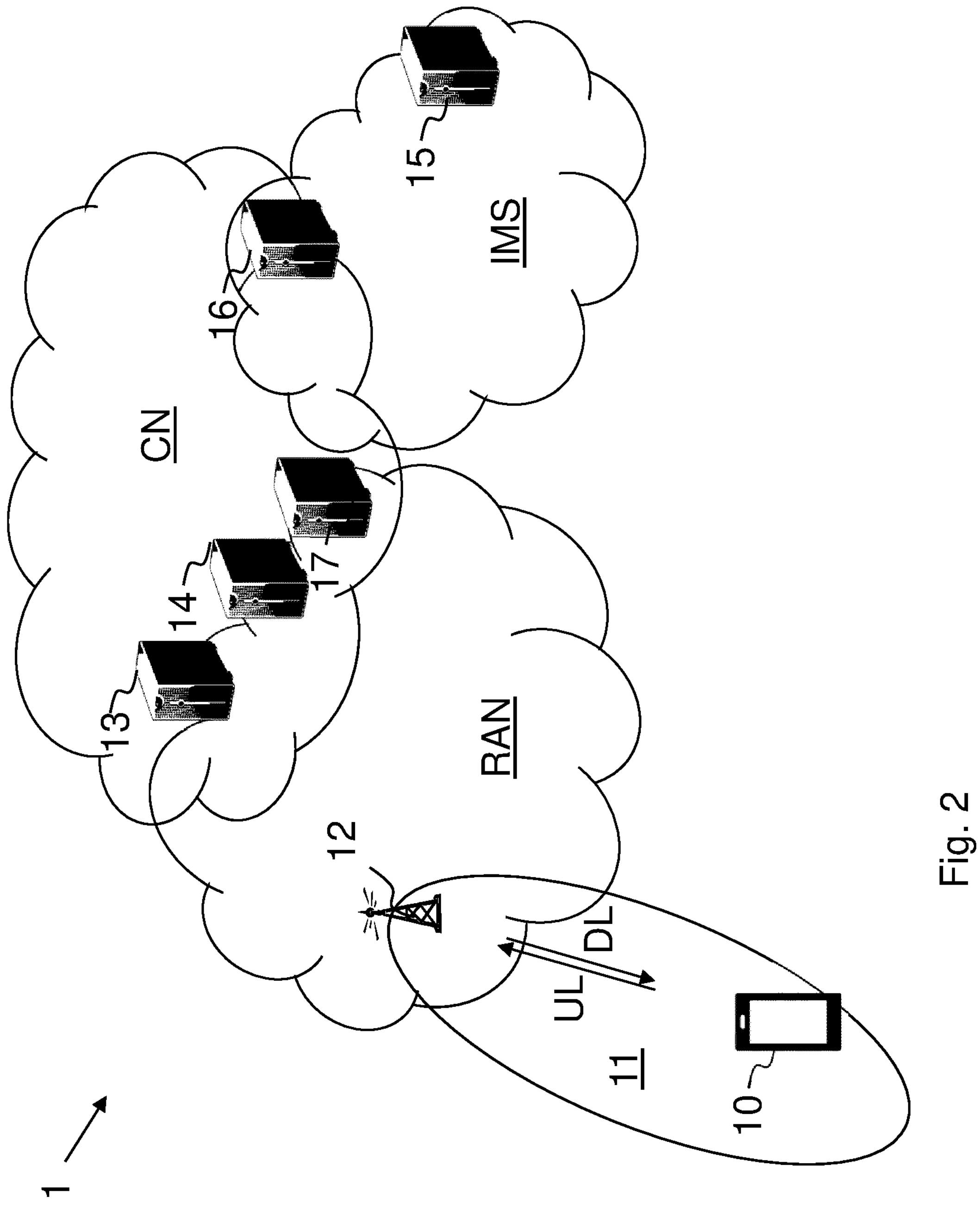
FIG. 2 shows a wireless communications network according to embodiments herein.

Embodiments herein relate to wireless communications networks in general. FIG. 2 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a user equipment (UE) 10, exemplified herein as a wireless device such as a mobile station, a non-access point (non-AP) station (STA), a STA and/or a wireless terminal, is comprised communicating via e.g. one or more Access Networks (AN), e.g. radio access network (RAN), to one or more core networks (CN). It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a radio network node 12 providing radio coverage over a geographical area, a first service area 11 or first cell, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the UE in form of DL transmissions to the UE and UL transmissions from the UE. It should be noted that a service area may be denoted as cell, beam, beam group or similar to define an area of radio coverage.

The wireless communication network 1 provides IMS services, such as voice over LTE (VOLTE) or similar, and comprises a first IMS node 15 and a second IMS node 16 of an IMS. The first IMS node 15 may be an application server provided by an IMS provider. The second IMS node 16 may be a Home Subscriber Server (HSS) or a Call Session Control Function (CSCF) node such as a P-CSCF or a S-CSCF node. The Call session control function, e.g., facilitates Session Internet Protocol (SIP) setup and teardown and the HSS plays the role of a location server in IMS, in addition to acting as an authentication, authorization, accounting (AAA) server. The CSCF may comprise one or more of distributed functions e.g. a proxy CSCF node (P-CSCF), an Interrogating CSCF (I-CSCF) node, and a Serving CSCF (S-CSCF) node. The P-CSCF acts as the entry point in the IMS network. The HSS is the main database of the current generation's cellular communications systems. It contains subscriber-related information, such as the authentication information and the list of services to which each user is subscribed.

As stated above the communication network comprises a number of core network nodes such as a first network node 13 for example an AMF and a second network node 14 such as an SMF, and a third network node 17 such as user data management (UDM) or another AMF.

The embodiments described herein provide a simple solution extending existing capabilities with enablers that provide important flexibility.

Figure 3:
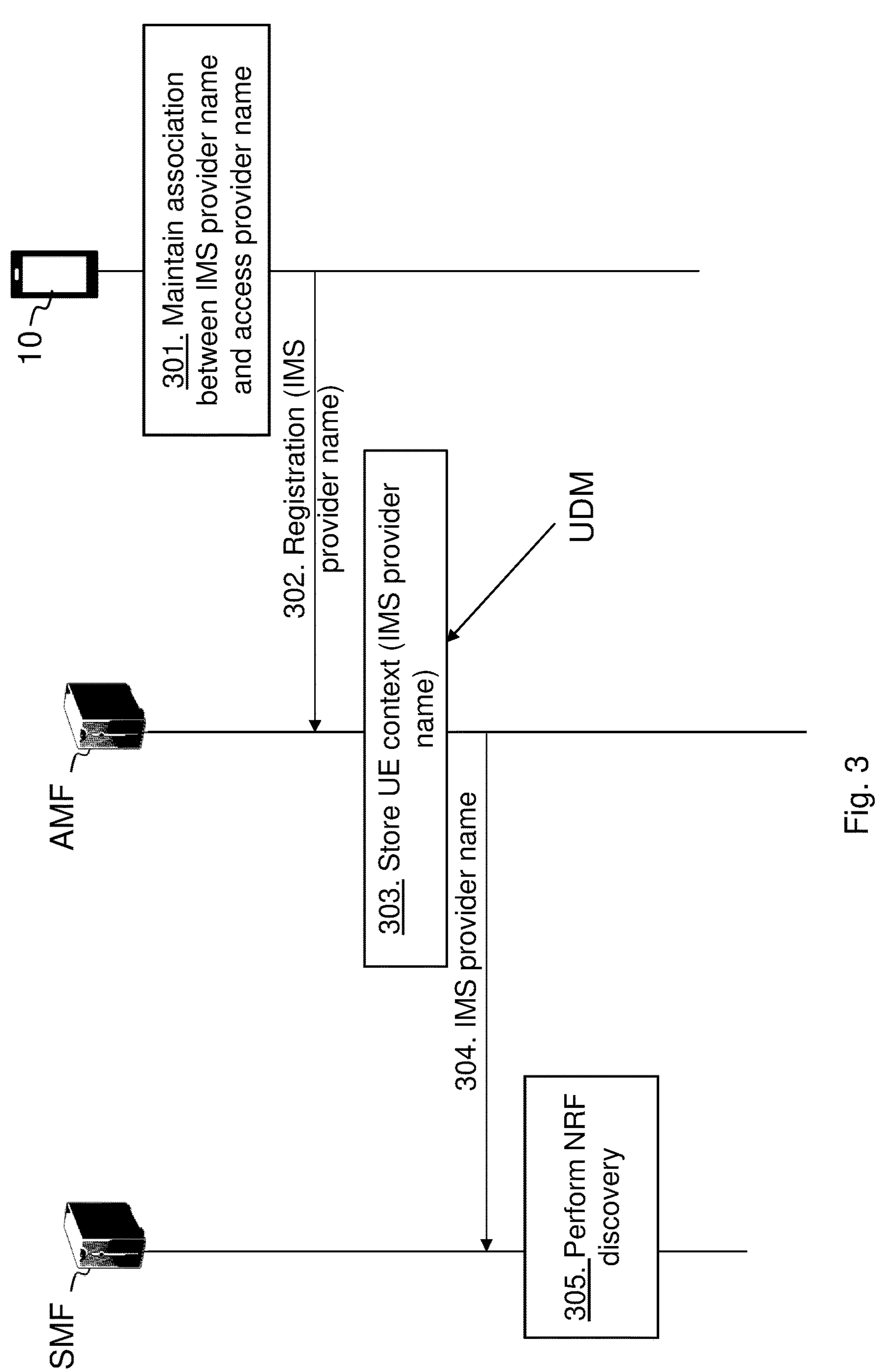
FIG. 3 shows a combined signalling scheme and flow chart according to embodiments herein.

FIG. 3 is a combined signalling and flowchart scheme according to embodiments herein.

Action 301. The UE 10 may maintain an association between an IMS provider name and an access provider name. The UE 10 may thus have a mapping between a first name indication indicating an IMS provider and a second name indication indicating an access provider. Thus, the UE 10 may maintain an association between IMS credentials and access credentials.

Action 302. The UE 10 includes the IMS provider name in a registration such as a 5GC Registration Procedure.

Action 303. The first network node 13, i.e., the AMF, receives the IMS provider name or names, and stores it in the UE context. Thus, at 5GC registration the UE 10 provides the IMS provider name and this is stored in the UE context by the AMF 13. Alternatively, the IMS provider name or names may be provided by an UDM during 5GC registration. Thus, the third network node 17 may provide the IMS provider name or names to the first network node 13.

Action 304. For local break out (LBO) and non-roaming case, the AMF 13 may pass the IMS provider name to the selected SMF in the Nsmf_PDUSession_CreateSMContext to the visiting SMF (vSMF). For Home routed case, vSMF passes the IMS provider name to the home SMF (hSMF) in Nsmf_PDUSession_Create to hSMF. Thus, when the UE 10 establishes an IMS session, the AMF may select the SMF that is dedicated for use with that specific IMS provider. The AMF selects an SMF configured in the AMF for the target IMS provider.

Action 305. The second network node 14, i.e., the SMF, may support the IMS provider name and use it to perform NRF discovery to discover one or more P-CSCFs such as the first or the second IMS node 15,16. The SMF may include the IMS provider name in the charging information. Hence, the P-CSCF configured or discovered by the SMF, via the NRF, corresponds to the IMS provider. The SMFs corresponding to the different IMS providers are configured in the AMF. The IMS provider is configured in the selected SMF for discovery of P-CSCF.

Alternatively, or additionally, the AMF select may select any SMF and include the IMS provider name. The SMF may then discover the P-CSCF corresponding to the target IMS provider in the incoming request.

For home routed scenarios, the vSMF passes the IMS provider name to the hSMF.

In the example above, option one, the UE 10 is configured with the IMS provider name which is provided to the AMF during 5GC Registration.

In option two, the UE IMS provider name is configured in an UE access subscription. The AMF acquirers the IMS provider name, from the UE access subscription, at 5GC Registration and is stored in the UE context. Otherwise, the same actions apply.

There are two potential sub-options that are possible with option one and option two. In sub-option1 the selected SMF by the AMF is assumed to be configured for use only with that IMS provider. Hence, a different SMF is used for each IMS provider. In the second sub-option the AMF passes to the SMF the IMS provider name. The SMF may then discover the P-CSCF corresponding to the target IMS provider. For home routed scenarios the vSMF passes the IMS provider name to the hSMF.

In another implementation, option three, a different IMS data network name (DNN) is configured in AMF subscription data in the subscribed DNN List in UDM for each IMS provider per UE. Each DNN name maps to a specific IMS provider configured in the AMF for that purpose. For example, DNN-IMS1 maps to IMS provider 1, DNN IMS2 maps to IMS provider 2. There will be one IMS DNN per UE in an AMF DNN Subscription List.

Three sub-options can support the above option three:

In the first sub-option the operator identifier (OI) in the AMF Subscription data for the UE is configured in the DNN part, hence the operator identifier identifies the IMS operator. In this case the selected SMF by the AMF is assumed to be configured for use only with that IMS provider and will be based on the OI in the DNN. Hence this requires a different SMF for each IMS provider. The SMF fetches the IMS provider from the SMF UE DNN subscribed list, so it can discover the corresponding P-CSCF. In this sub-option there are no impacts on the AMF beyond the configuration of the SMF to use with a specific IMS provider.

The second sub-option is similar to the first sub-option with the difference that the selected SMF by the AMF is assumed to be used for all IMS providers. The SMF either receives the IMS provider name from AMF as in option one and option two or SMF fetches the IMS provider from the SMF UE DNN subscribed list, so it can discover the corresponding P-CSCF. The SMF has the option in this case to also use a separate UPF for every IMS provider to isolate the traffic.

The third sub-option is used in case it is not possible to use the OI of the DNN. Hence a different DNN Network Identifier (NI) for every IMS provider may be used in this case. Hence, the AMF may be configured with mapping between DNN NI and IMS provider. In this sub-option, at 5GC Registration, the AMF, configured with the mapping between DNN NI and IMS provider, determines the IMS provider from the AMF Subscription data and the remaining aspects of option one and option two can be reused as is.

SMF in option 3 may also include the IMS provider name to the charging records.

5GC Impacted procedures.

Figure 4:
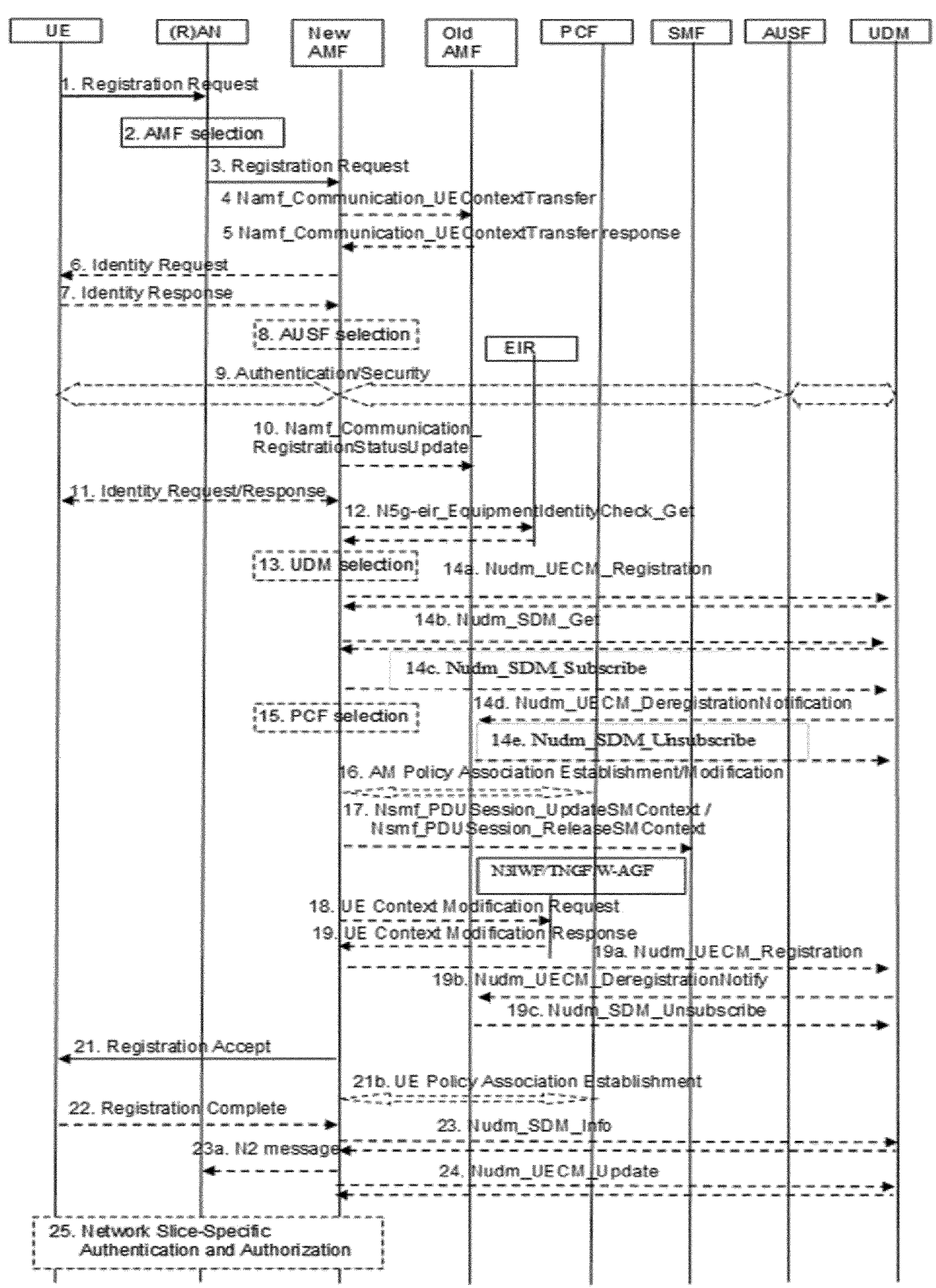
FIG. 4 shows a signalling scheme according to embodiments herein.

Registration is shown in FIG. 4

For Option One Sub-Option 1:

Changes are in the following steps:

Step 1, and 3 where the IMS provider name is conveyed to the AMF.

Step 5 where IMS provider name can be transferred from an old AMF to a new AMF AMF is impacted to store the IMS provider name in the UE context.

AMF selects an SMF configured in the AMF for the target IMS provider.

For Option One Sub-Option 2:

Changes are in the following steps:

Step 1, and 3 where the IMS provider name is conveyed to the AMF.

Step 5 where IMS provider name can be transferred from an old AMF to a new AMF AMF is impacted to store the IMS provider name in the UE context.

Figure 5:
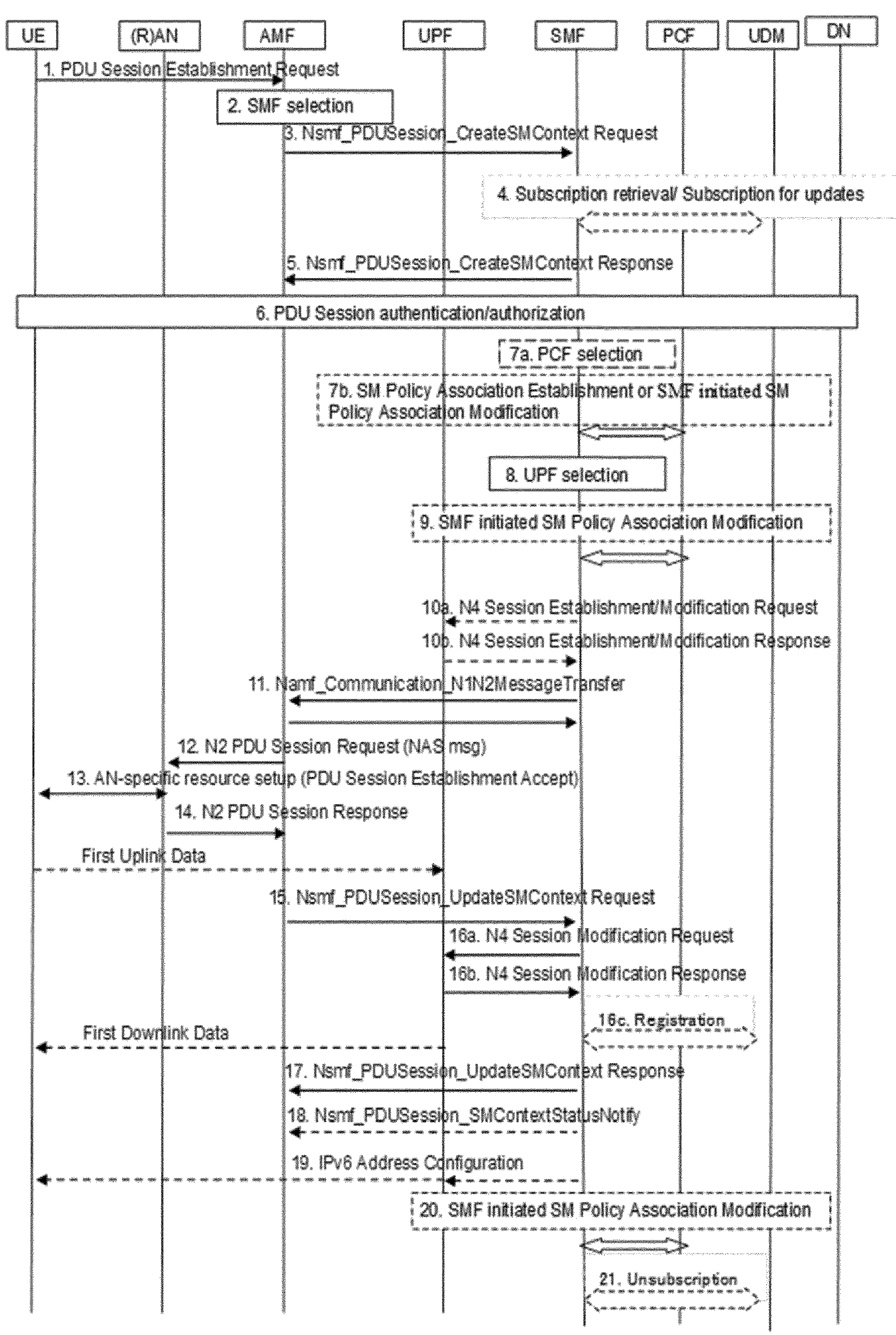
FIG. 5 shows a signalling scheme according to embodiments herein.

FIG. 5 shows PDU Session Establishment Procedure LBO and non-roaming case

For Option One Sub-Option 1: No Impact

SMF includes the IMS provider name in the charging data

For Option One Sub-Option 2:

The main change is in step 3 carrying the IMS provider name

SMF includes the IMS provider name in the charging data

SMF stores the needed information in the PDU session state.

Figure 6:
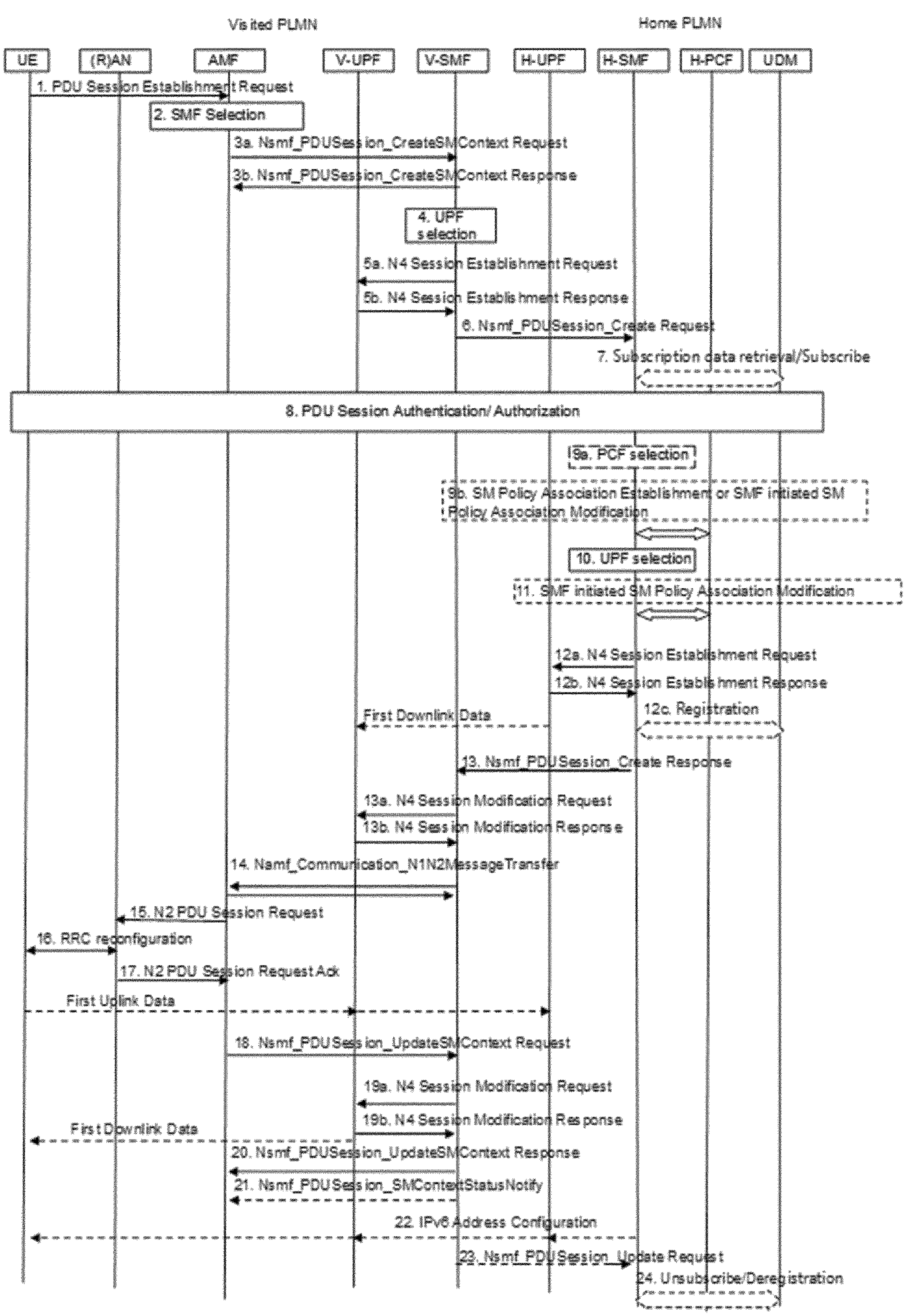
FIG. 6 shows a signalling scheme according to embodiments herein.

FIG. 6 option one Home Routed case;

The main change in steps 3*a* and step 6 carrying the IMS provider name.

SMF new behavior is described above.

Option 2:

Impacted Nodes:

AMF: Receives the IMS provider names from UDM, stores it in the UE context.

In option 2 sub-option1, AMF selects an SMF configured in the AMF for the target IMS provider.

In option 2 sub-option 2, for LBO, and non-roaming case, AMF passes the IMS provider name to the selected SMF in the Nsmf_PDUSession_CreateSMContext to the vSMF For both above services this will be an optional incoming attribute.

UDM: Stores the IMS provider name in the AMF subscription data and send it to the AMF during 5GC registration:

AMF Subscription Data is updated to include support for IMS provider name.

SMF: SMF has to support the IMS provider name in option 2 sub-option2 and use it to perform NRF discovery to discover P-CSCFs For Home routed case, vSMF passes the IMS provider name to the hSMF in Nsmf_PDUSession_Create to hSMF.

Also SMF have to include the IMS provider name in the charging information

Figure 7:
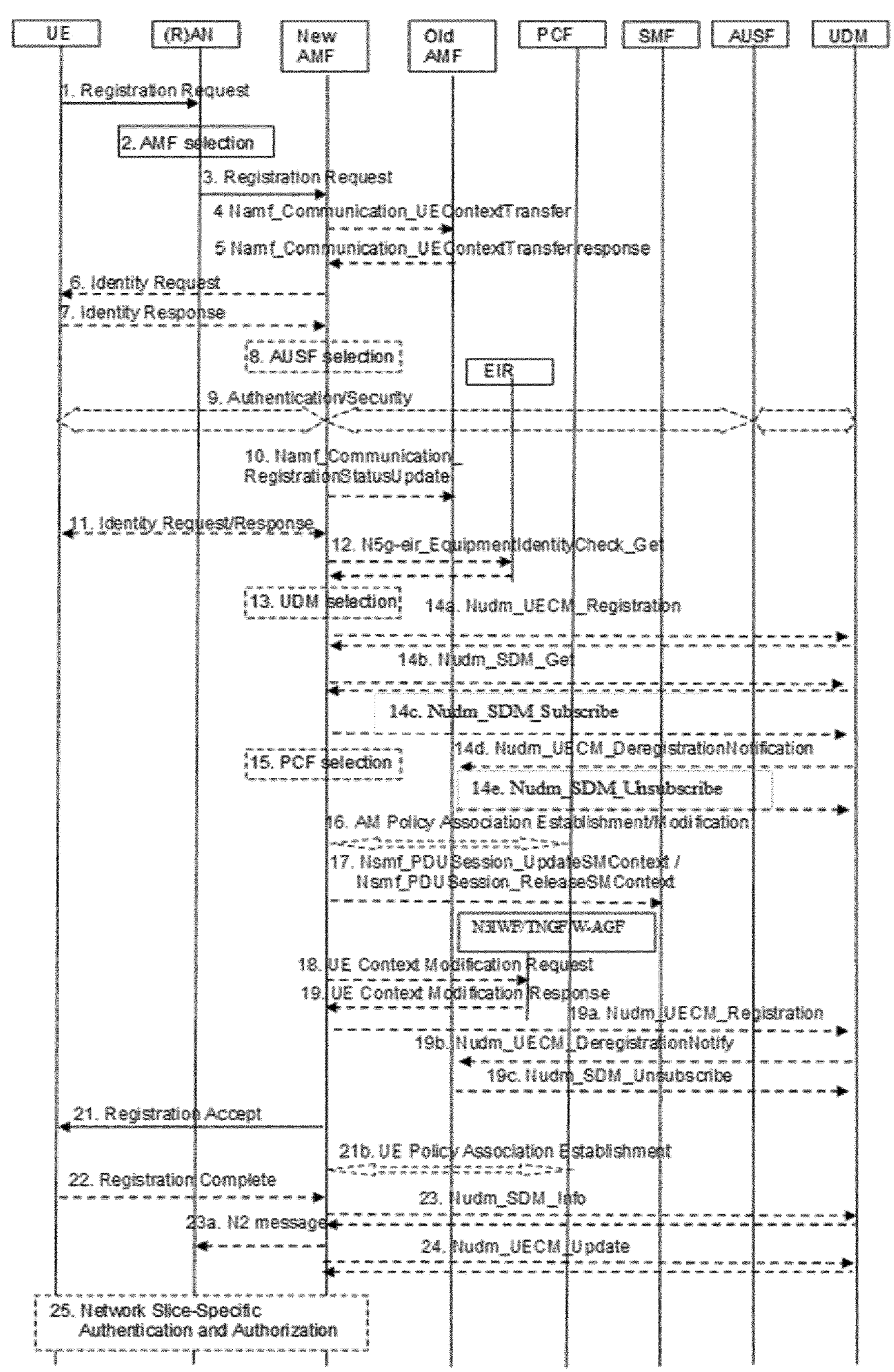
FIG. 7 shows a signalling scheme according to embodiments herein.

Impacted Procedures:

FIG. 7 shows 5GC Registration.

For Option 2 Sub-Option 1:

Changes are in the following steps:

Step 5 where IMS provider name can be transferred from an old AMF to a new AMF UDM passes the IMS provider name from UDM to AMF where it gets stored in the UE context.

AMF is impacted to store the IMS provider name in the UE context.

AMF selects an SMF configured in the AMF for the target IMS provider.

For Option 2 Sub-Option 2: Changes are in the Following Steps:

Step 5 where IMS provider name can be transferred from an old AMF to a new AMF UDM passes the IMS provider name from UDM to AMF where it gets stored in the UE context.

AMF is impacted to store the IMS provider name in the UE context.

Remaining AMF and SMF impacts are as in option 1

Figure 8:
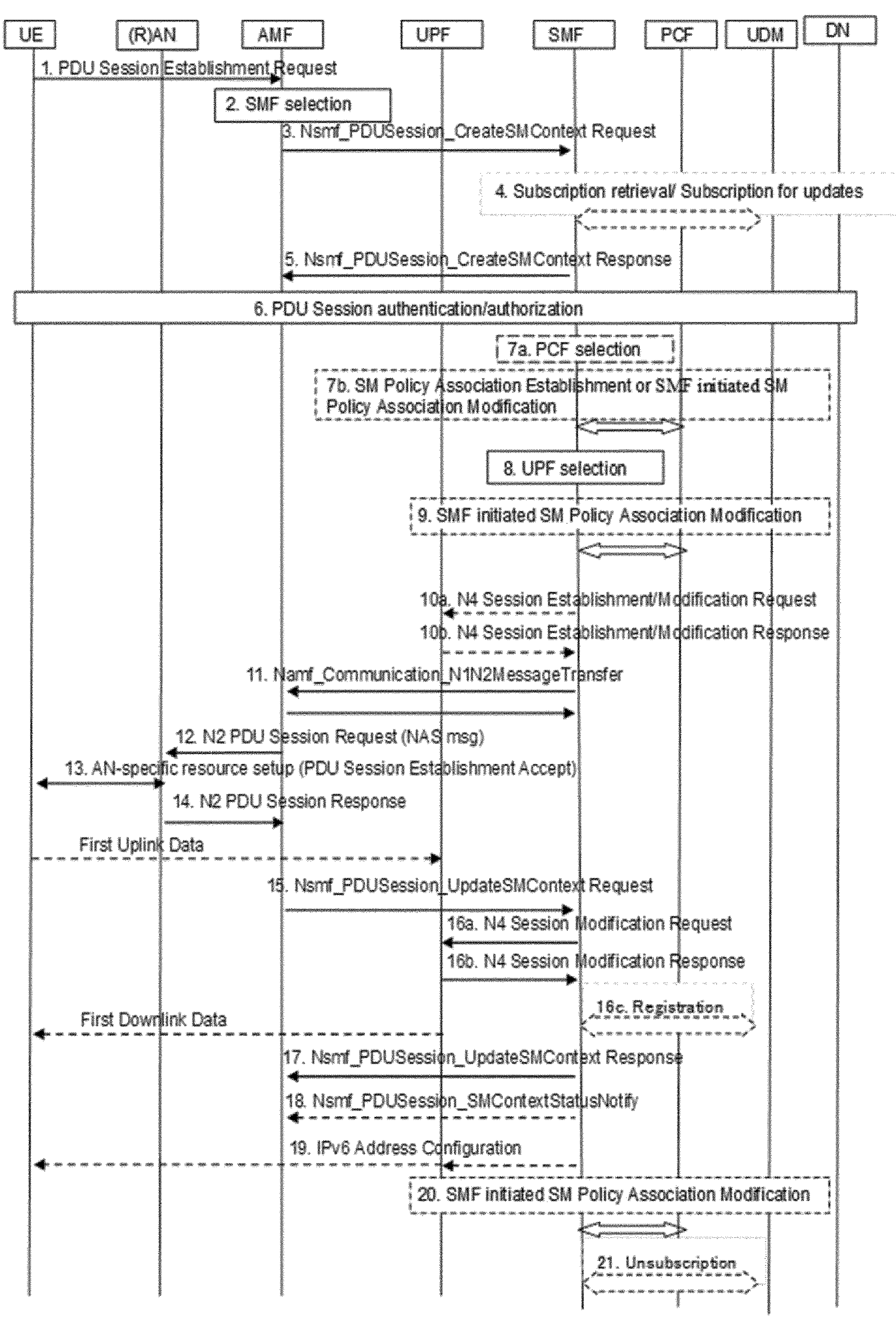
FIG. 8 shows a signalling scheme according to embodiments herein.

Option 3:

FIG. 8 shows a signalling scheme according to embodiments herein.

Impacted Nodes:

Sub-Option1 and Sub-Option 2 of Option 3.

AMF Impacts: AMF identifies the IMS operator based on the OI and selects the SMF accordingly, either preconfigured SMF per IMS operator or just passing the IMS provider to any SMF.

SMF Impacts: SMF locates the IMS provider corresponding to the DNN received from UDM, then performs the NRF discovery to locate the corresponding P-CSCF. SMF stores the needed information in the PDU session state. Or alternatively the SMF receives from AMF the IMS provider name.

Impacted Nodes Sub-Option3 of Option 3

AMF impacts: Maps the DNN name to IMS provider name, stores it in the UE context. AMF is configured with mapping between IMS DNN names and IMS provider name.

In option 3, sub-option1, AMF selects an SMF configured in the AMF for the target IMS provider.

In option 3, sub-option 2, for LBO, and non-roaming case, AMF passes the IMS provider name to the selected SMF in the Nsmf_PDUSession_CreateSMContext to the vSMF For Home routed case, vSMF passes the IMS provider name to the hSMF in Nsmf_PDUSession_Create to hSMF.

For both above services this will be an optional incoming attribute

SMF: SMF has to support the IMS provider name in sub-option2 and use it to perform NRF discovery to discover P-CSCFs Also SMF may have to include the IMS provider name in the charging information Impacted Procedures:

5GC Registration.

For Sub-Option 1:

Changes are in the following steps:

Step 5 where IMS provider name can be transferred from an old AMF to a new AMF AMF is impacted to store the IMS provider name in the UE context.

Step 14, AMF receives the subscribed DNN list and locates the IMS provider corresponding to the IMS DNN. IMS provider name is stored in the UE context.

AMF selects an SMF configured in the AMF for the target IMS provider.

For Sub-Option 2: Changes are in the Following Steps:

Step 5 where IMS provider name can be transferred from an old AMF to a new AMF AMF is impacted to store the IMS provider name in the UE context.

AMF and SMF impacts are as in option 1 for PDU session establishment.

SMF in option 3 with all its sub-options1, 1,2 and 3 also includes the IMS provider name in the charging records.

P-CSCF and SMF Behavior Applicable to all Options1, 2, and 3.

In order to select the proper P-CSCF, P-CSCF may have to include the IMS provider it is associated with when it registers its profile in NRF (section Y.12 TS 23.228-g40).

The SMF may also acquire the information and compare it to the IMS provider of interest to locate the correct CSCF, see section 5.16.3.11 TS 23.501-g40.

Figure 9:
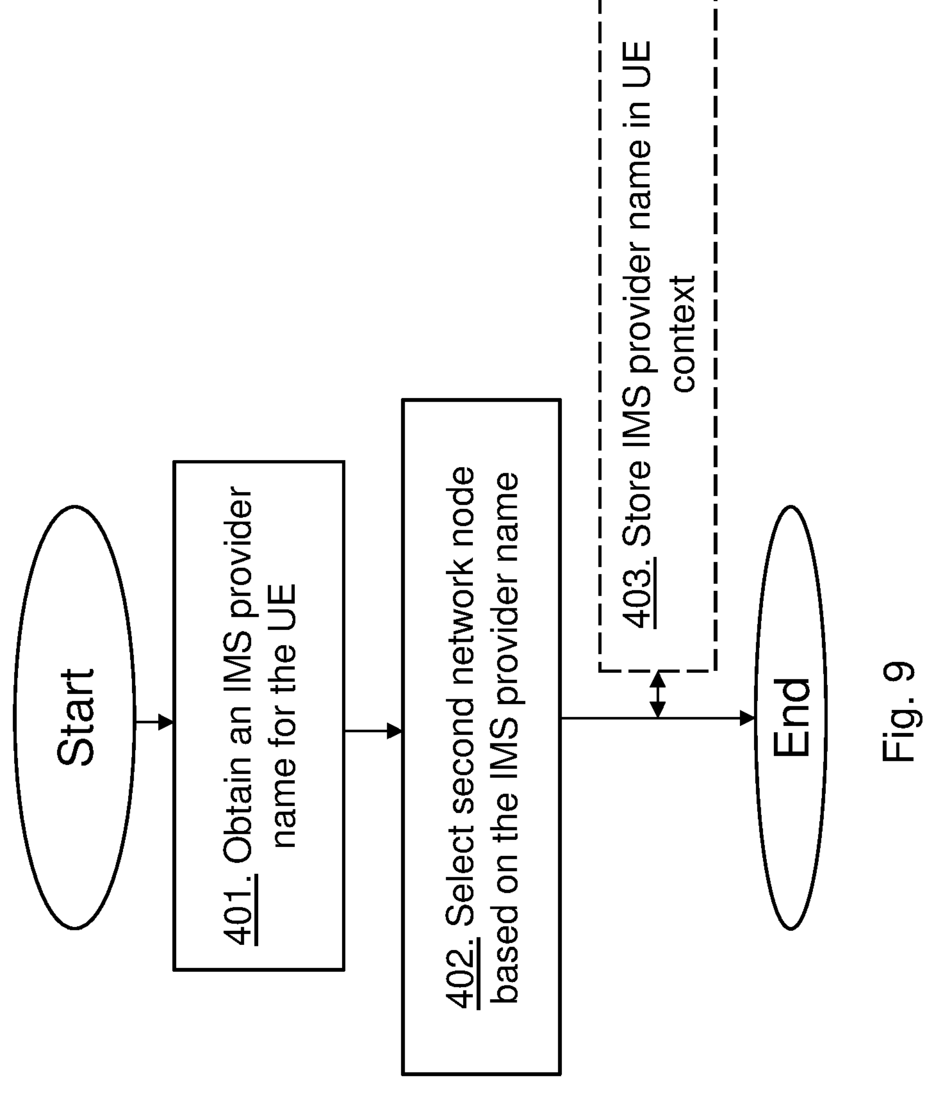
FIG. 9 shows a flow chart depicting a method performed by a first network node according to embodiments herein.

The method actions performed by the first network node, such as an AMF, for handling communication or providing an IMS service for the UE 10 in the wireless communications network 1 according to embodiments will now be described with reference to a flowchart depicted in FIG. 9. The actions do not have to be taken in the order stated below but may be taken in any suitable order. Dashed boxes indicate optional features.

Action 401. The first network node 13 obtains an IMS provider name for the UE 10 using the IMS service such as VOLTE. The IMS provider name may be received from the UE 10, from a UE subscription or from the third network node 17.

Action 402. The first network node 13 selects the second network node 14 for the IMS service based on the obtained IMS provider name.

Action 403. The first network node 13 may store the IMS provider name in a UE context of the UE 10.

Figure 10:
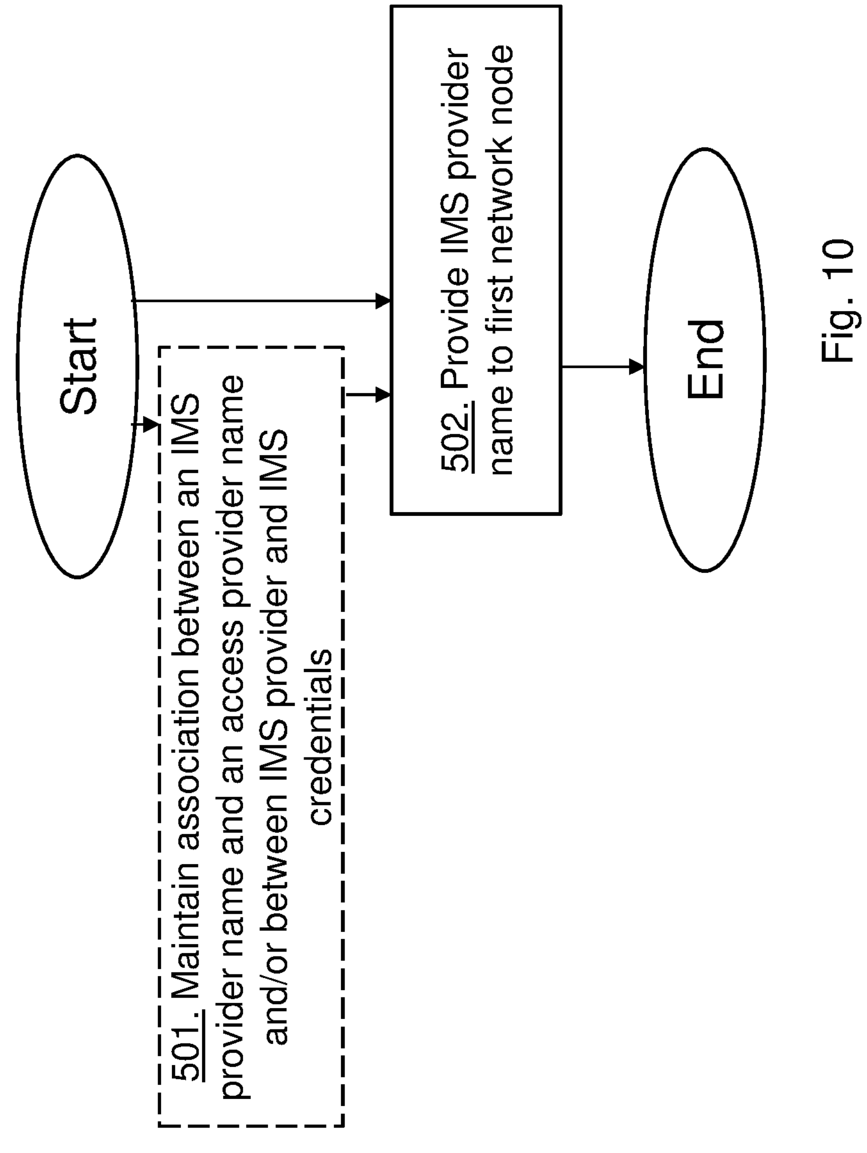
FIG. 10 shows a flow chart depicting a method performed by a user equipment according to embodiments herein.

The method actions performed by the UE 10 for handling the IMS service in the wireless communications network 1 according to embodiments will now be described with reference to a flowchart depicted in FIG. 10. The actions do not have to be taken in the order stated below, but may be taken in any suitable order. Dashed boxes indicate optional features.

Action 501. The UE 10 may maintain an association between the IMS provider name and an access provider name. The UE 10 may thus have a mapping between a first name indication indicating an IMS provider and a second name indication indicating an access provider. The UE 10 may maintain an association between the IMS credentials and the access credentials and/or an association between IMS provider and IMS credentials.

Action 502. The UE 10 provides to the first network node 13, the IMS provider name for the UE 10 using the IMS service. The IMS provider name may be provided in a 5GC Registration Procedure. Hence, the UE 10 may include the IMS provider name in a registration such as a 5GC Registration Procedure.

Figure 11:
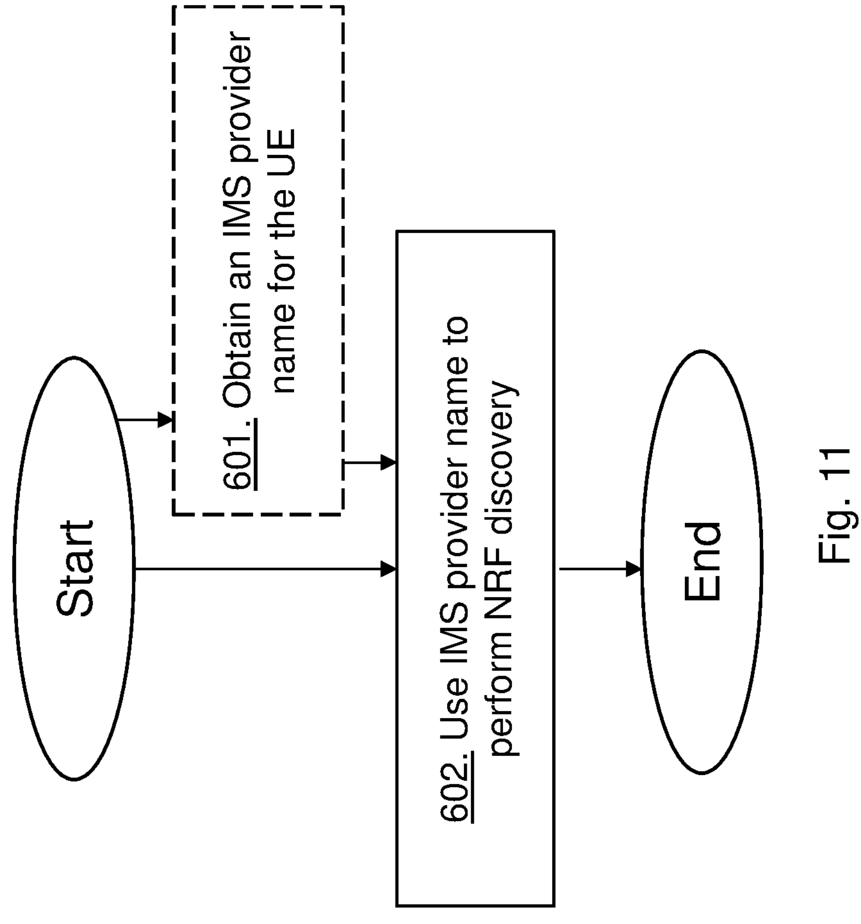
FIG. 11 shows a flow chart depicting a method performed by a second network node according to embodiments herein.

The method actions performed by the second network node 14, such as an SMF, for providing the IMS service for the UE 10 in the wireless communications network 1 according to embodiments will now be described with reference to a flowchart depicted in FIG. 11. The actions do not have to be taken in the order stated below but may be taken in any suitable order. Dashed boxes indicate optional features.

Action 601. The second network node 14 may obtain the IMS provider name for the UE using the IMS service such as VOLTE. The IMS provider name may be received from the first network node 13 or from the third network node 17. Thus, the third network node 17 may provide the IMS provider name or names to the second network node 14.

Action 602. The second network node 14 (may support or may have a mapping for the IMS provider name to the one or more IMS nodes) uses the IMS provider name to perform network repository function (NRF) discovery to discover one or more IMS nodes for the UE 10 using the IMS service, for example, one or more P-CSCFs such as the first or the second IMS node 15, 16.

Figure 12A:
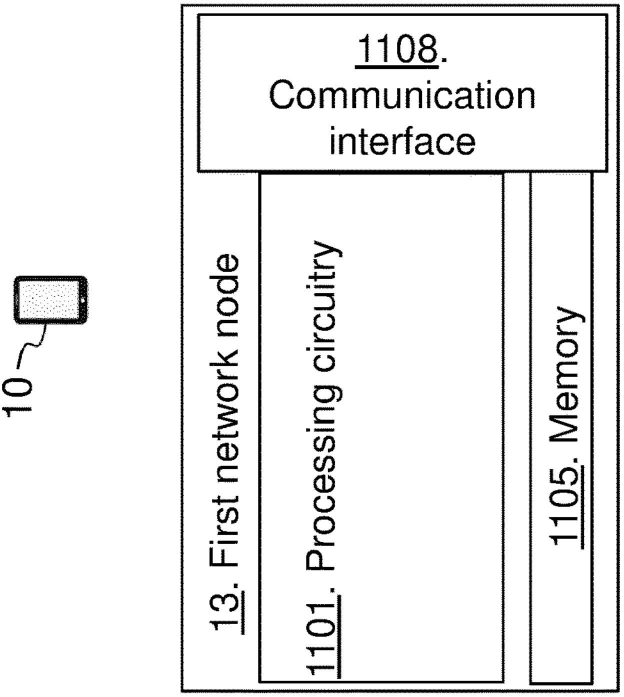
FIG. 12*a* shows a block diagram depicting first network nodes according to embodiments herein.
Figure 12A:
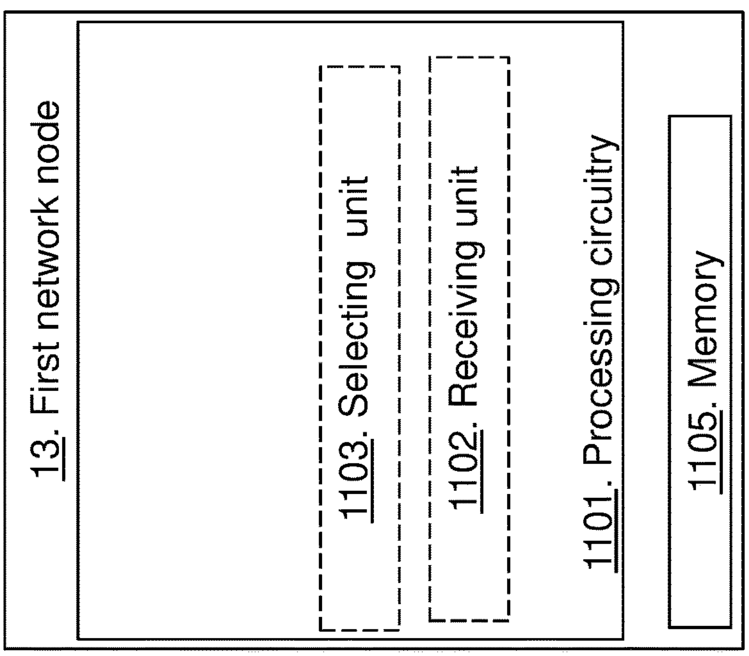

FIG. 12*a* is a block diagram depicting embodiments of the first network node 13 for handling communication or the IMS service for the UE 10 in the wireless communications network 1 according to embodiments herein.

The first network node 13 may comprise processing circuitry 1101, e.g., one or more processors, configured to perform the methods herein.

The first network node 13 may comprise a receiving unit 1102, e.g., a receiver. The first network node 13, the processing circuitry 1101 and/or the receiving unit 1102 is configured to obtain the IMS provider name for the UE 10 using the IMS service such as VOLTE. The IMS provider name may be received from the UE 10, from a UE subscription or from the third network node 17 and may then be stored at the first network node 13 in associating it with the UE 10. Thus, the first network node 13 may be configured to store the IMS provider name in the UE context of the UE 10.

The first network node 13 may comprise a selecting unit 1103. The first network node 13, the processing circuitry 1101 and/or the selecting unit 1103 is configured to select the second network node 14 for the IMS service based on the obtained IMS provider name.

The first network node 13 may comprise a memory 1105. The memory 1105 comprises one or more units to be used to store data on, such as data packets, mapping, name indication, type indication, mapping of IMS provider names and access provider names/UEs, networks, mobility events, measurements, sizes related to types of data transmissions, events and applications to perform the methods disclosed herein when being executed, and similar. Furthermore, the first network node 13 may comprise a communication interface 1108 such as comprising a transmitter, a receiver, a transceiver and/or one or more antennas.

The methods according to the embodiments described herein for the first network node 13 are respectively implemented by means of e.g., a computer program product 1106 or a computer program, comprising instructions, i.e., software code portions, which, when executed on at least one processor, cause the at least one processor to carry out the actions described herein, as performed by the first network node 13. The computer program product 1106 may be stored on a computer-readable storage medium 1107, e.g., a disc, a universal serial bus (USB) stick or similar. The computer-readable storage medium 1107, having stored thereon the computer program product, may comprise the instructions which, when executed on at least one processor, cause the at least one processor to carry out the actions described herein, as performed by the first network node 13. In some embodiments, the computer-readable storage medium may be a transitory or a non-transitory computer-readable storage medium. Thus, embodiments herein may disclose a first network node 13 for handling communication in a wireless communications network, wherein the first network node 13 comprises processing circuitry and a memory, said memory comprising instructions executable by said processing circuitry whereby said first network node 13 is operative to perform any of the methods herein.

Figure 12B:
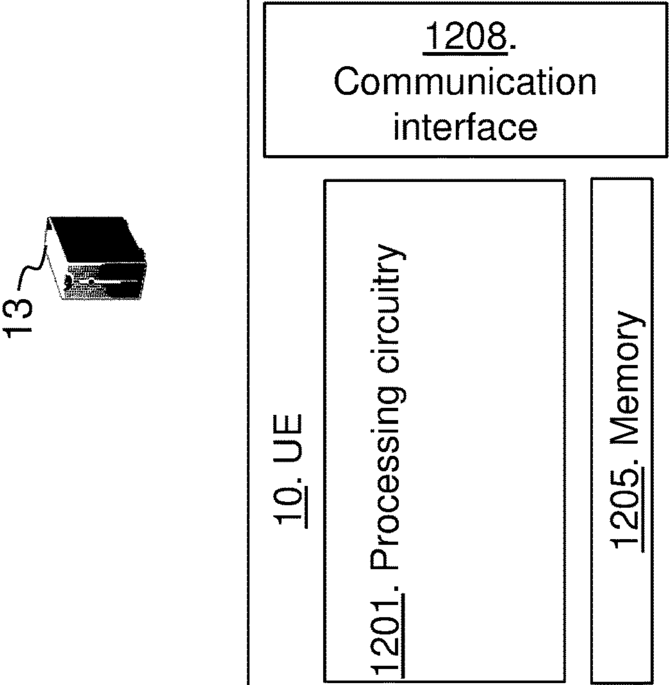
FIG. 12*b* shows a block diagram depicting UEs according to embodiments herein.
Figure 12B:
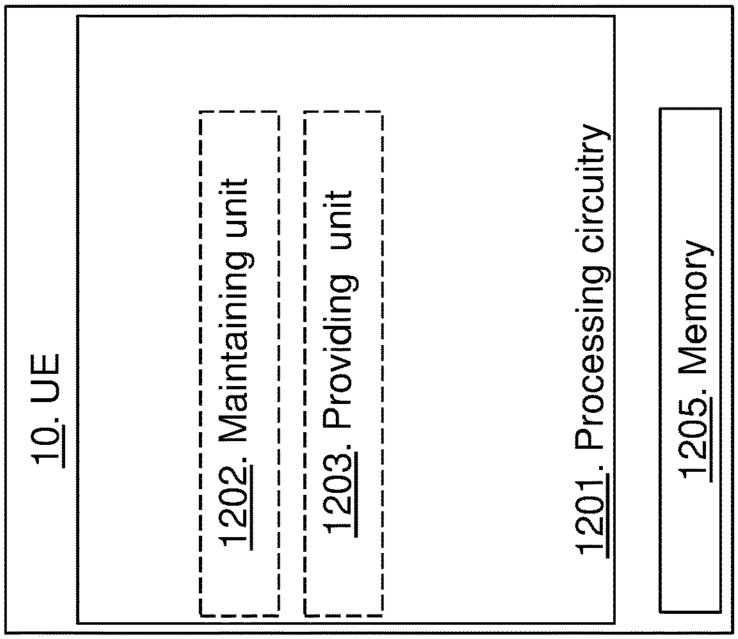
Figure 12B:
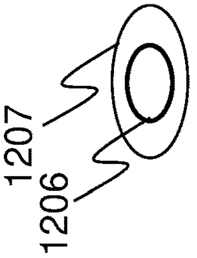

FIG. 12*b* is a block diagram depicting the UE 10 for handling communication or an IMS service in the wireless communications network 1 according to embodiments herein.

The UE 10 may comprise processing circuitry 1201, e.g., one or more processors, configured to perform the methods herein.

The UE 10 may comprise a maintaining unit 1202, e.g., a memory unit. The UE 10, the processing circuitry 1201 and/or the maintaining unit 1202 may be configured to maintain the association between an IMS provider name and an access provider name. The UE 10 may thus have the mapping between the first name indication indicating the IMS provider and the second name indication indicating the access provider. Thus, the UE 10, the processing circuitry 1201 and/or the maintaining unit 1202 may be configured to maintain the association between the IMS credentials and the access credentials and/or the association between IMS provider and IMS credentials.

The UE 10 may comprise a providing unit 1203, e.g., a transmitter or a transceiver. The UE 10, the processing circuitry 1201 and/or the providing unit 1203 is configured to provide to the first network node 13, the IMS provider name for the UE 10 using the IMS service. The IMS provider name may be provided in a 5GC Registration Procedure. Hence, the UE 10 may be configured to provide the IMS provider name to the first network node 13 such as to include the IMS provider name in a registration such as a 5GC Registration Procedure.

The UE 10 may comprise a memory 1205. The memory 1205 comprises one or more units to be used to store data on, such as data packets, grants, name indication(s), type indication(s), indices, bitmap, indications, IMS provider names, IMS provider names mapped to access providers, mobility events, measurements, events and applications to perform the methods disclosed herein when being executed, and similar. Furthermore, the UE 10 may comprise a communication interface 1208 such as comprising a transmitter, a receiver, a transceiver and/or one or more antennas.

The methods according to the embodiments described herein for the UE 10 are respectively implemented by means of e.g. a computer program product 1206 or a computer program, comprising instructions, i.e., software code portions, which, when executed on at least one processor, cause the at least one processor to carry out the actions described herein, as performed by the UE 10. The computer program product 1206 may be stored on a computer-readable storage medium 1207, e.g. a disc, a universal serial bus (USB) stick or similar. The computer-readable storage medium 1207, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE 10 for handling communication in a wireless communications network, wherein the UE 10 comprises processing circuitry and a memory, said memory comprising instructions executable by said processing circuitry whereby said UE 10 is operative to perform any of the methods herein.

Figure 12C:
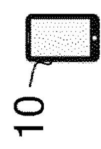
FIG. 12*c* shows a block diagram depicting first network nodes according to embodiments herein.
Figure 12C:
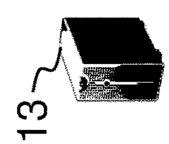
Figure 12C:
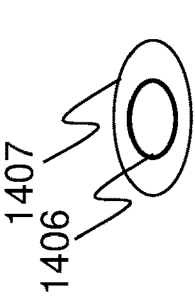

FIG. 12*c* is a block diagram depicting the second network node for handling the IMS service for the UE 10 in the wireless communications network 1 according to embodiments herein.

The second network node 14 may comprise processing circuitry 1401, e.g., one or more processors, configured to perform the methods herein.

The second network node 14 may comprise a receiving unit 1402, e.g., a receiver. The second network node 14, the processing circuitry 1401 and/or the receiving unit 1402 may be configured to obtain an IMS provider name for the UE 10 using the IMS service such as VOLTE. The IMS provider name may be received from the first network node 13 associating it with the UE 10 or the third network node 17.

The second network node 14 may comprise a discovering unit 1403. The second network node 14, the processing circuitry 1401 and/or the discovering unit 1403 is configured to perform NRF discovery using the IMS provider name to discover the one or more IMS nodes for the UE using the IMS service, such as one or more P-CSCFs such as the first or the second IMS node 15, 16. The second network node 14 may be configured to support or have a mapping for the IMS provider name to the one or more IMS nodes.

The second network node 14 may comprise a memory 1405. The memory 1405 comprises one or more units to be used to store data on, such as data packets, mapping, name indication, type indication, mapping of IMS provider names and access provider names/UEs/P-CSCFs, networks, mobility events, measurements, sizes related to types of data transmissions, events and applications to perform the methods disclosed herein when being executed, and similar. Furthermore, the second network node 14 may comprise a communication interface 1408 such as comprising a transmitter, a receiver, a transceiver.

The methods according to the embodiments described herein for the second network node 14 are respectively implemented by means of e.g., a computer program product 1406 or a computer program, comprising instructions, i.e., software code portions, which, when executed on at least one processor, cause the at least one processor to carry out the actions described herein, as performed by the second network node 14. The computer program product 1406 may be stored on a computer-readable storage medium 1407, e.g., a disc, a universal serial bus (USB) stick or similar. The computer-readable storage medium 1407, having stored thereon the computer program product, may comprise the instructions which, when executed on at least one processor, cause the at least one processor to carry out the actions described herein, as performed by the second network node 14. In some embodiments, the computer-readable storage medium may be a transitory or a non-transitory computer-readable storage medium. Thus, embodiments herein may disclose a second network node 14 for handling communication in a wireless communications network, wherein the second network node 14 comprises processing circuitry and a memory, said memory comprising instructions executable by said processing circuitry whereby said second network node 14 is operative to perform any of the methods herein.

In some embodiments a more general term "network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, gNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
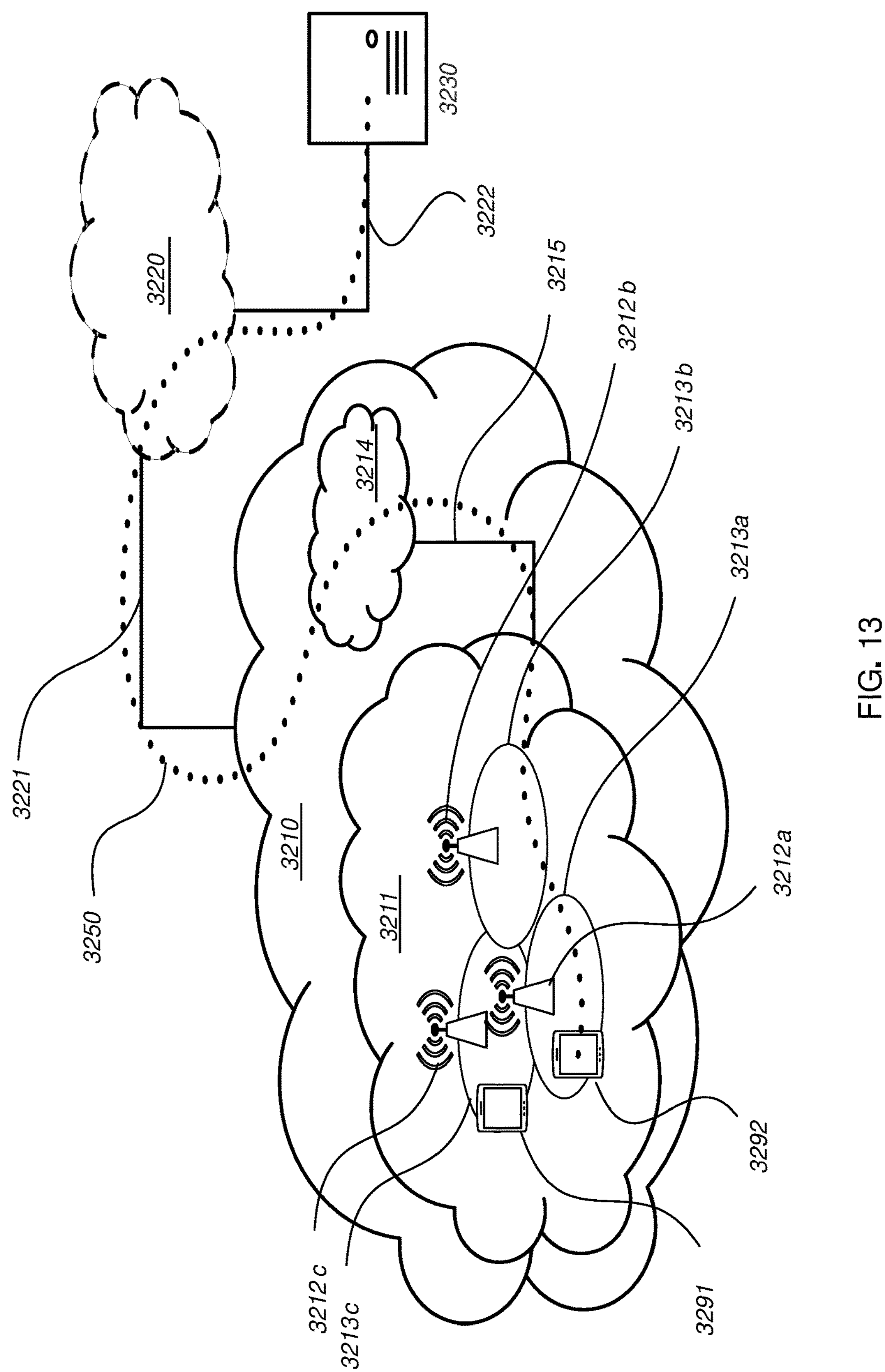
FIG. 13 schematically illustrates a telecommunication network connected via an intermediate network to a host computer.

With reference to FIG. 13, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10 and relay UE 13, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 14) served by the base station 3320. The communication interface 3326 may be configured to facilitate a connection 3360 to the host computer 3310. The connection 3360 may be direct or it may pass through a core network (not shown in FIG. 14) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 14:
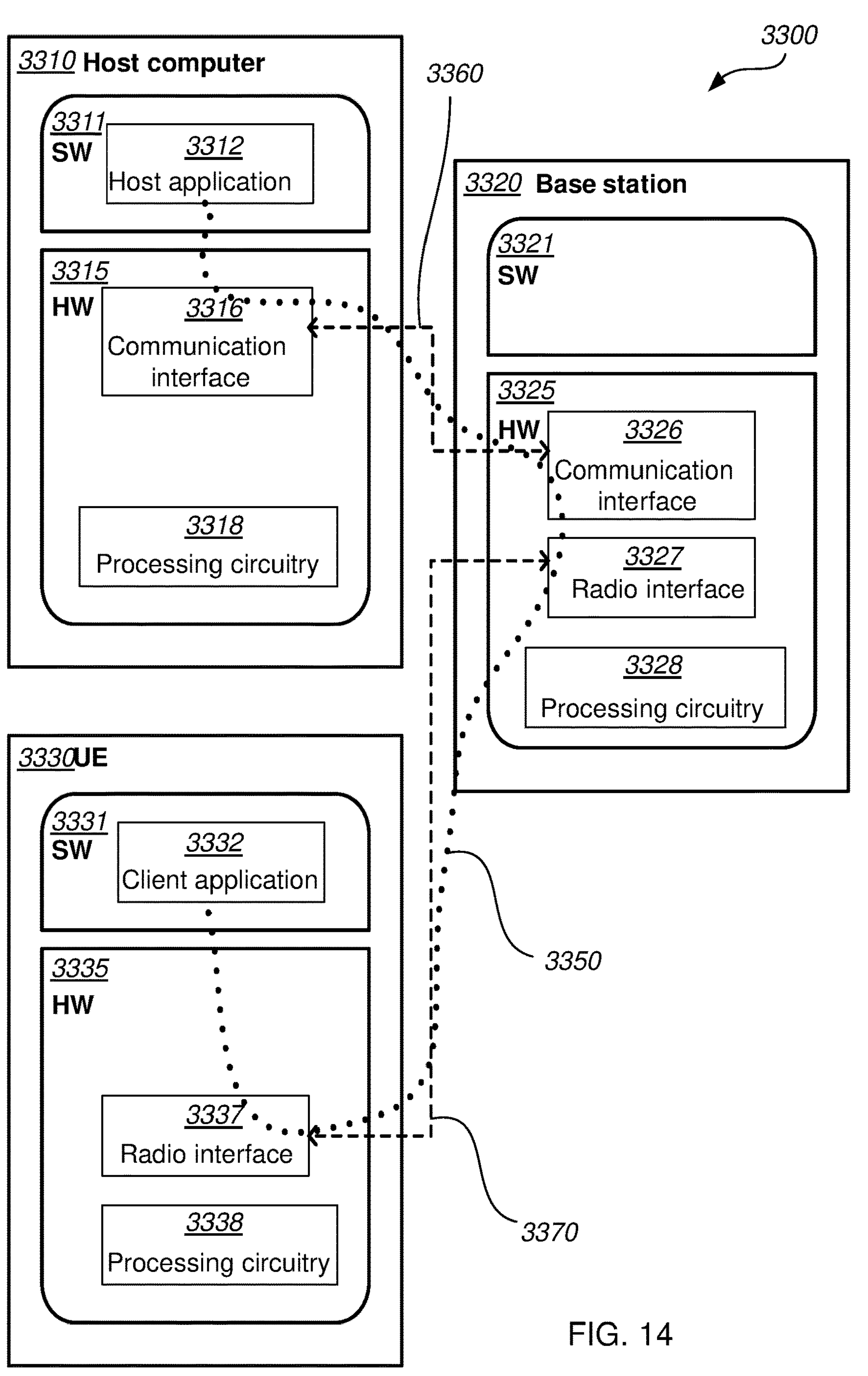
FIG. 14 is a generalized block diagram of a host computer communicating via a base station with a user equipment over a partially wireless connection.

It is noted that the host computer 3310, base station 3320 and UE 3330 illustrated in FIG. 14 may be identical to the host computer 3230, one of the base stations 3212*a*, 3212*b*, 3212*c* and one of the UEs 3291, 3292 of FIG. 13, respectively. This is to say, the inner workings of these entities may be as shown in FIG. 14 and independently, the surrounding network topology may be that of FIG. 13.

In FIG. 14, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance of using an IMS service efficiently and thereby provide benefits such as reduced user waiting time, and better responsiveness since interference is reduced.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 15, 16:
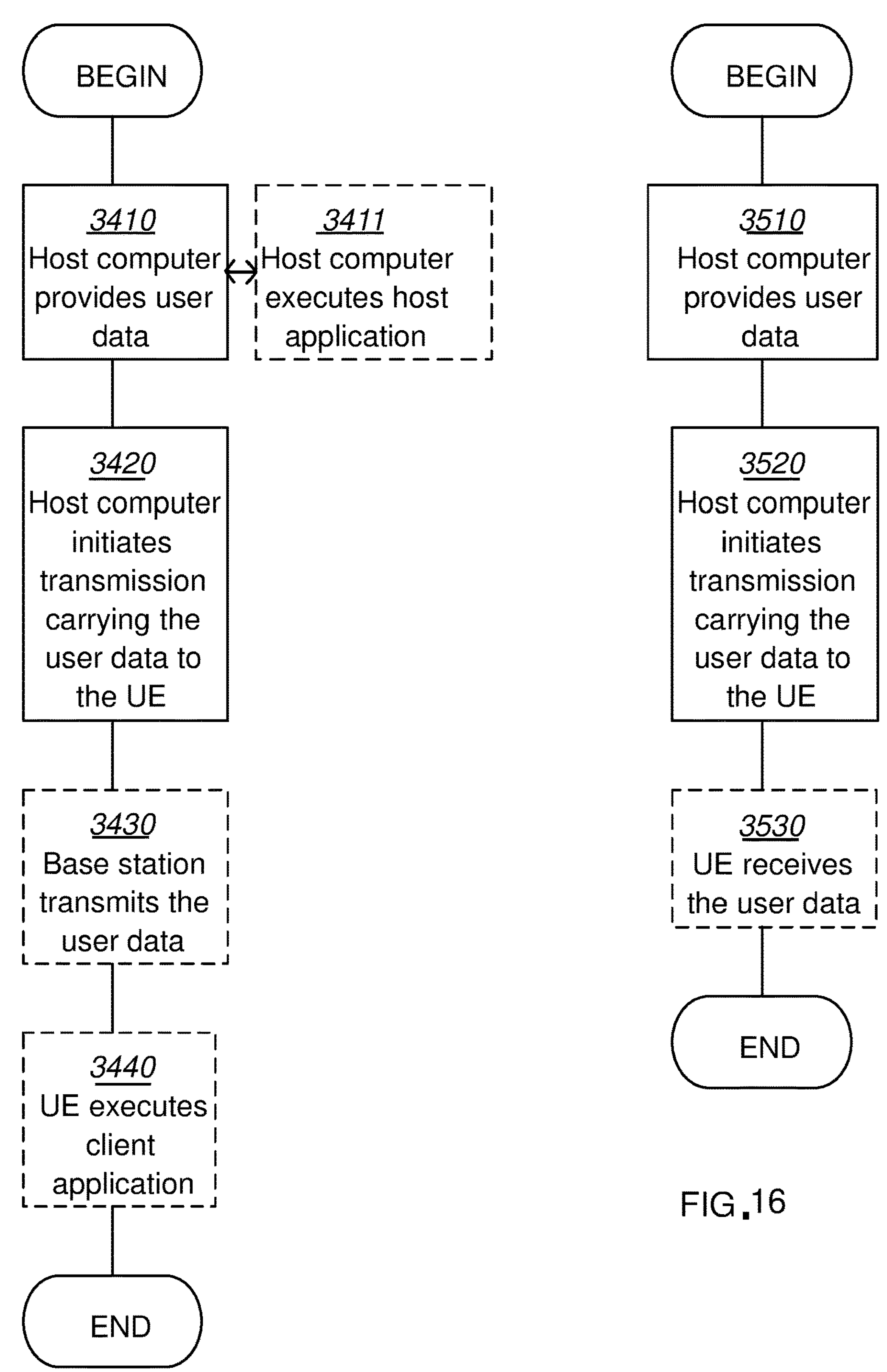
FIGS. 15-18 are flowcharts illustrating methods implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 17, 18:
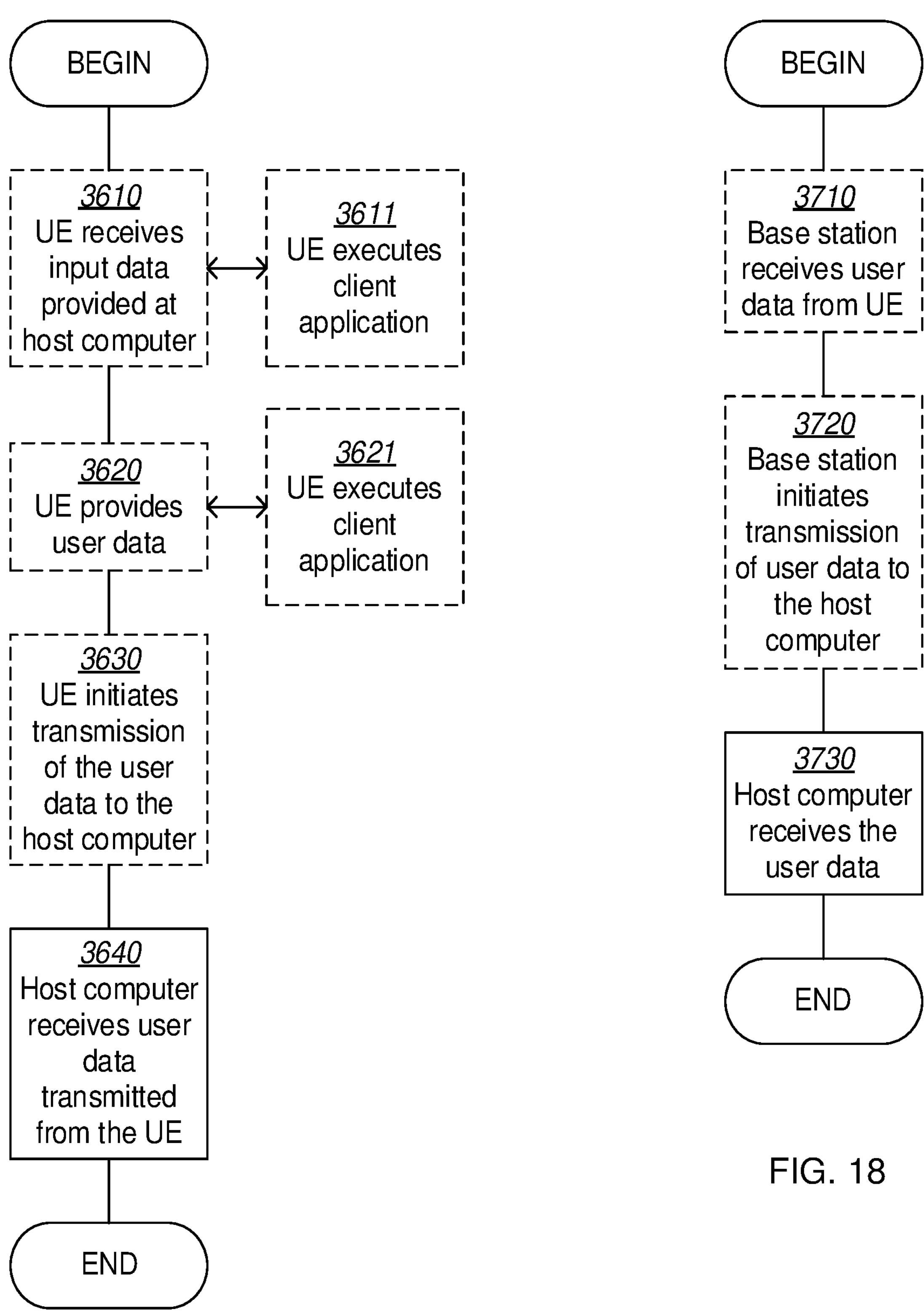

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATION EXPLANATION

5GC 5th Generation Core Network
BSR Buffer Status Report
CORESET Control Resource Set
CN Core Network
CSS Common Search Space
DCI Downlink Control Indicator
DVT Data Volume Threshold EDT MIB Master Information Block Early Data Transmission
Msg Message
NR New Radio
PBCH Physical Broadcast Channel
PDCCH Physical Downlink Control Channel
PDSCH Physical Downlink Shared Channel
PRACH Physical Random Access Channel
RACH Random Access Channel
RAR Random Access Response
SDT Small Data Transmission
SSB Synchronization Signal Block

REFERENCES 1. 3GPP TR 23.700-07 v1.2.0: Study on enhanced support of non-public networks
2. 3GPP TS 23501-g40
3. 3GPP TS 23502-g40 “5G System; Procedures for the 5G System”
4. 3GPP TS 24501 g41
5. 3GPP TS 23503 vg40
6. 3GPP TR #23.700-40 v0.4.0.

The invention claimed is:

1. A method performed by an access and mobility management function (AMF) of a wireless communications network, the method comprising:
- receiving, from a user equipment (UE), a request to register with the wireless communications network, wherein the request includes a name of a provider of IP multimedia subsystem (IMS) voice service to the UE;
- selecting a session management function (SMF), of the wireless communications network, that is associated with the provider of IMS voice service identified by the name; and
- sending, to the SMF, a request to establish a session of the IMS voice service for the UE via the wireless communications network, wherein the request to establish includes the name of the provider of IMS voice service.

2. The method according to claim 1, further comprising storing the name of the provider of IMS voice service in a UE context of the UE.

3. A first network node node comprising communication interface circuitry and processing circuitry that are operably coupled and are configured to perform the method of claim 1 performed by the AMF of the wireless communications network.

4. The first network node according to claim 3, wherein the communication interface circuitry and the processing circuitry are further configured to store the name of the provider of IMS voice service in a UE context of the UE.

5. A method performed by a user equipment (UE) configured to operate in a wireless communications network, the method comprising
- sending, to an access and mobility management function (AMF) of the wireless communications network, a request to register with the wireless communications network, wherein the request includes a name of a provider of IP multimedia subsystem (IMS) voice service to the UE.

6. The method according to claim 5, further comprising maintaining an association between the name of the provider of IMS voice service and an access provider name.

7. The method according to claim 5, further comprising maintaining one or more of the following: a second association between IMS credentials and access credentials, and a third association between IMS providers and IMS credentials.

8. A user equipment (UE) comprising communication interface circuitry and processing circuitry that are operably coupled are configured to perform the method of claim 3.

9. The UE according to claim 8, wherein the communication interface circuitry and the processing circuitry are further configured to maintain one or more of the following:
- an association between the name of the provider of IMS voice service and an access provider name;
- a second association between IMS credentials and access credentials; and
- a third association between IMS providers and IMS credentials.

10. A method performed by a session management function (SMF) of a wireless communications network, the method comprising:
- receiving, from an access and mobility management function (AMF) of the wireless communication network, a request to establish a session of IP multimedia subsystem (IMS) voice service for a user equipment (UE) via the wireless communications network, wherein the request includes a name of a provider of IMS voice service to the UE; and
- using the name of the provider of IMS voice service, discovering via a network repository function (NRF) one or more IMS nodes corresponding to the provider of the IMS voice service.

11. The method according to claim 10, wherein the second network node supports a mapping for the name of the provider of IMS voice service to the one or more IMS nodes.

12. A second network node comprising communication interface circuitry and processing circuitry that are operably coupled and are configured to perform the method of claim 10 performed by the SMF of the wireless communications network.

13. The second network node according to claim 12, wherein the second network node supports a mapping for the name of the provider of IMS voice service to the one or more IMS nodes.

* * * * *